United States Patent [19]

Ravitts

[11] 3,739,986

[45] June 19, 1973

[54] AXIAL FLOW LIQUID AERATOR

[75] Inventor: Richard B. Ravitts, Rockford, Ill.

[73] Assignee: Richards of Rockford, Inc., Rockford, Ill.

[22] Filed: Aug. 17, 1971

[21] Appl. No.: 172,517

[52] U.S. Cl. .................................. 239/221, 239/182
[51] Int. Cl. .............................................. B05b 17/00
[58] Field of Search ................. 239/219, 220, 221, 239/182; 259/108, 111; 417/61

[56] References Cited
UNITED STATES PATENTS

| 3,235,877 | 2/1966 | Grob | 239/221 X |
| 2,137,547 | 11/1938 | Snow | 259/108 |
| 1,927,943 | 9/1933 | Long | 239/221 X |
| 2,967,433 | 1/1961 | Phillips | 259/108 |
| 3,320,160 | 5/1967 | Welles, Jr. et al. | 259/111 X |
| 3,323,782 | 6/1967 | Clough | 259/108 |
| 3,462,132 | 8/1969 | Kaelin | 417/61 |

Primary Examiner—M. Henson Wood, Jr.
Assistant Examiner—John J. Love
Attorney—Henry L. Brinks, Hume, Clement et al.

[57] ABSTRACT

An axial flow liquid aerator includes a float with an upright tubular throat extending therethrough and includes a drum-type impeller telescoped into the throat. The impeller is rotatable with a power shaft driven by a plurality of motors supported on the float and equally spaced around the throat to balance the float against tipping as the impeller is rotated to pump a sleeve of water from a pond upwardly through the throat between the outer wall of the impeller and the throat wall to circulate and aerate the water in the pond. A speed reducer connected between the motors and the power shaft is operable to transfer rotational motion from each of the motors to rotate the shaft at a speed less than the rotational speed of the motor drive shafts. The speed reducer includes a small pulley mounted on each drive shaft, larger pulleys fixed to the power shaft and endless belts trained around the pulleys to transfer the rotational motion. The tension in the endless belts is maintained by a belt tensioner which is connected between the motors and which includes lever arms connected at one end to one side of each of the motors and springs connecting the ends of each arm together.

10 Claims, 4 Drawing Figures

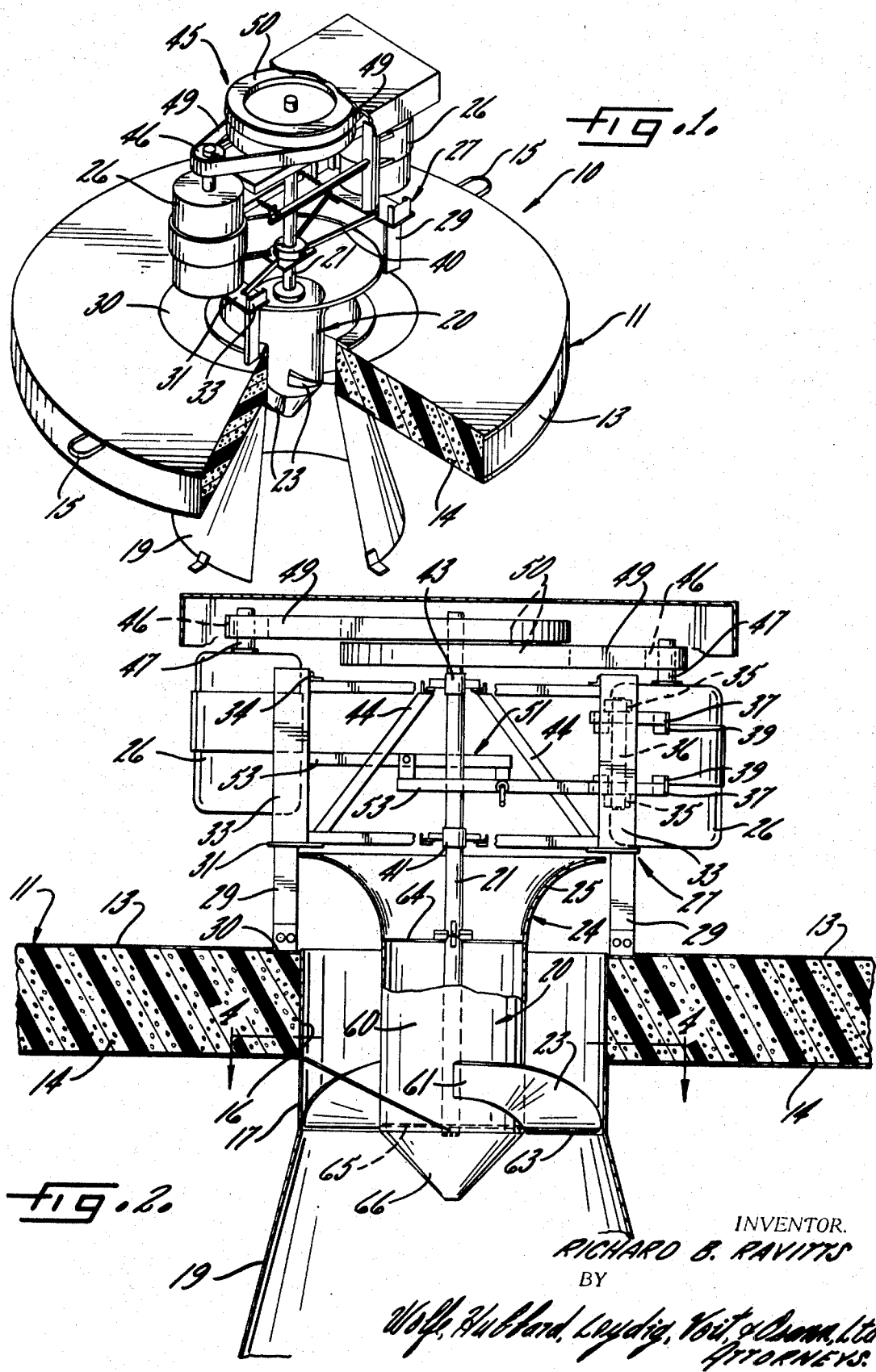

INVENTOR.
RICHARD B. RAVITTS

AXIAL FLOW LIQUID AERATOR

BACKGROUND OF THE INVENTION

This invention relates to a liquid aerator of the type typically used in ponds or tanks to enrich the oxygen content of water or other liquid, to scrub undesirable gases from the water, to produce an induced flow in the pond for mixing and solid suspension purposes, or to cool large quantities of water for recirculation. More particularly, the invention relates to an aerator of the same general type disclosed in Ravitts U.S. Pat. No. 3,416,729 in which the water is pumped upwardly from a pond through an upright tubular throat by a motor driven impeller and impinges against a power rotated diffuser which slings the liquid outwardly relative to the throat for interface contact with the surrounding air prior to falling back into the pond.

SUMMARY OF THE INVENTION

The general object of the present invention is to provide a new, improved and relatively large horsepower aerator of the above general character which, when compared with prior aerators of equivalent horsepower, is less expensive, is adapted to aerate a large volume of liquid more efficiently and is more stable and better balanced against tipping. More particularly, the impeller is driven by a plurality of motors supported on the float in positions equally spaced from one another around the throat so as to balance the float horizontally, the motors being lower in total cost and having a lower composite center of gravity than a single large motor of equivalent horse power. In addition, provision is made of a unique drum impeller which enables the impeller blades to be moved at an optimum velocity to reduce drag and cascading of the liquid and to permit efficient use of the power applied to the impeller.

A more detailed object is to provide a comparatively simple, inexpensive and light weight speed reducer which utilizes belts to drive the power shaft at a speed lower than the rotational speed of the motors.

Another object is to provide a belt tensioning arrangement for maintaining the driving belts under equal tension so that equal power is applied by each motor to turn the impeller shaft.

These and other objects and advantages will become more apparent from the following detailed description when taken in conjunction with the accompanying drawings.

BRIEF DESCRIPTION OF THE DRAWINGS

FIG. 1 is a fragmentary perspective view of an aerator embodying the novel features of the present invention.

FIG. 2 is an enlarged side elevational view of the aerator with parts broken away and shown in section.

DESCRIPTION OF THE PREFERRED EMBODIMENT

Figure 3:
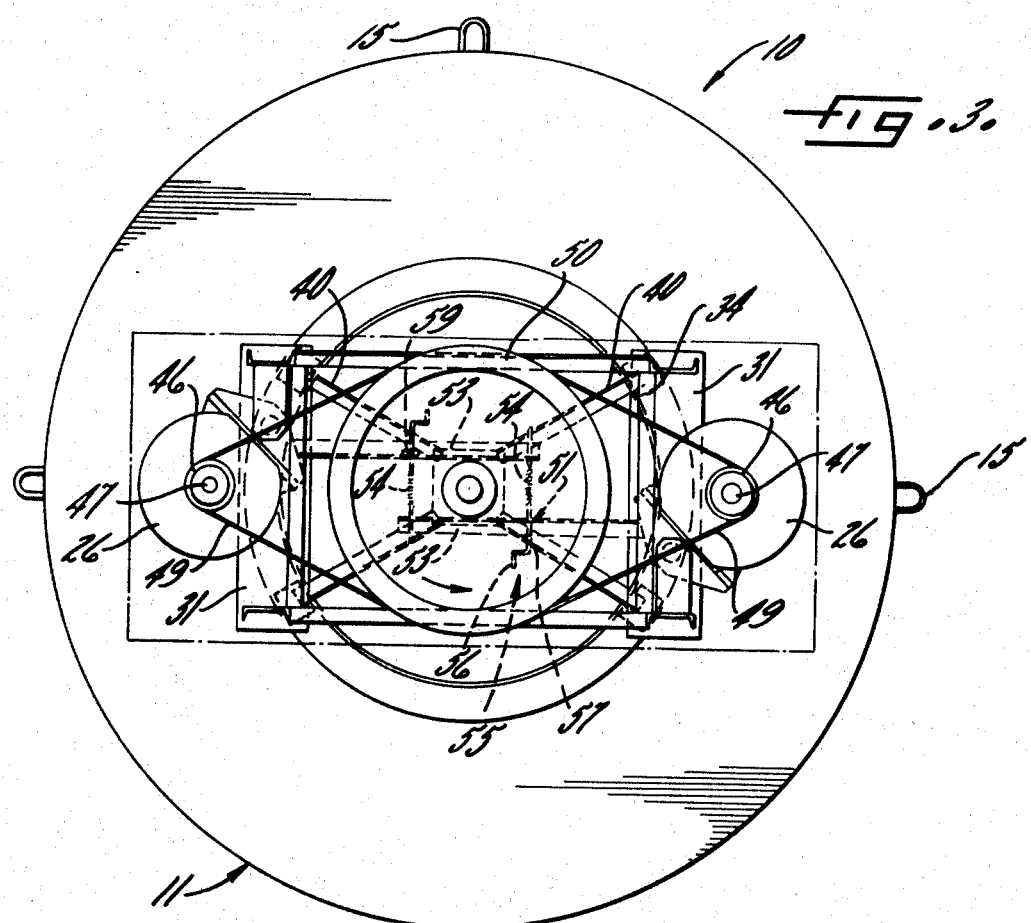
FIG. 3 is an enlarged top plan view of the aerator with parts removed for clarity.
Figure 4:
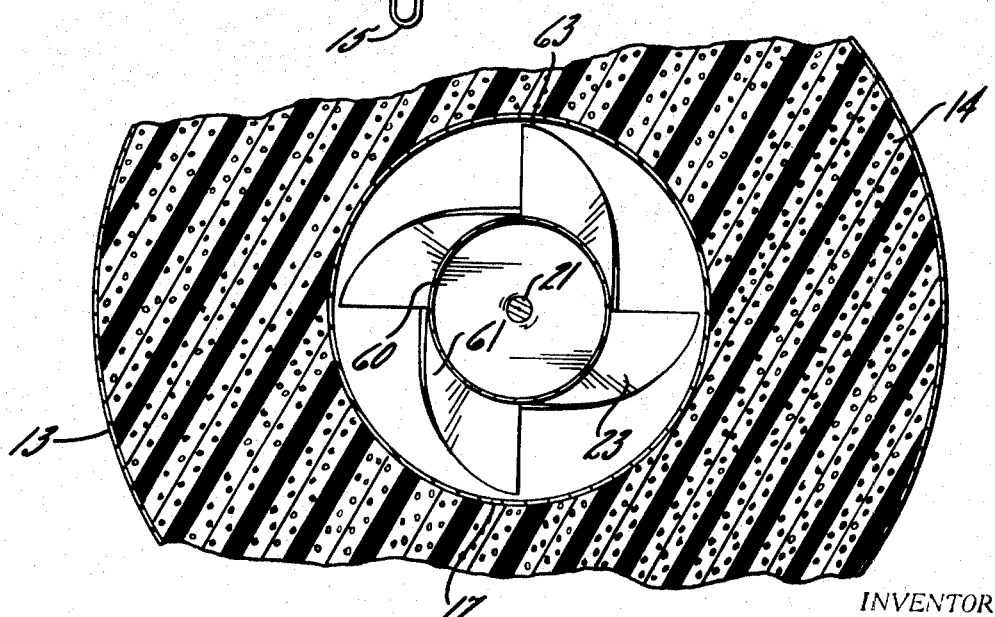
FIG. 4 is a fragmentary cross-sectional view taken substantially along line 4—4 of FIG. 2.

As shown in the drawings for purposes of illustration, the invention is embodied in a liquid aerator 10 adapted to float in a body of liquid such as water in a tank, a pool or waste treatment pond and serving to enrich the oxygen content of the water while scrubbing the latter of undesirable gases and producing an induced flow in the parent body of water. Alternatively, the aerator may be used to cool heated water before such water is recirculated through various types of systems.

When used in a waste treatment pond, the aerator 10 acts to scrub and oxidize the water therein by continuously drawing water upwardly out of the pond and then slinging the water into the surrounding atmosphere for interface contact with the air before falling back to the surface of the pond. The water is slung outwardly from the aerator with considerable turbulence so that noxious gases in the water are released and replaced by oxygen from the atmosphere. At the same time, a flow of water is induced in the parent body to mix the water therein.

More specifically, the aerator 10 includes a support comprising a buoyant float 11 formed by a stainless steel outer shell 13 which is filled with a low density material 14 such as polyurethane foam. The float may be moored in the pond by attaching cables (not shown) to eyes 15 angularly spaced around the periphery of the shell.

Extending vertically through the center of the float 11 is a cylindrical opening 16 (FIG. 2) into which is telescoped an upright tubular throat 17 defining a passage accommodating the flow of water upwardly out of the pond and into the atmosphere. At its lower inlet end, the throat is formed with an outwardly flaring intake shroud 19 immersed in the water and establishing an entryway into the throat. The upper outlet end of the throat is located near the top of the float to discharge the water into the atmosphere.

Water is pumped upwardly from the pond and through the throat 17 for interaction with the air by an axial flow impeller 20 telescoped into the throat and fastened to a rotatable power shaft 21 extending axially into the throat and carried by the float 11. The impeller includes a plurality of angularly spaced blades 23 radiating outwardly relative to the shaft and operable to cut through and propel the water upwardly through the throat and against a diffuser 24 rotatable with the shaft above the throat outlet. Preferably, the diffuser is formed on its lower side with an upwardly and outwardly curving concave surface 25 which deflects and slings the upwardly rising water outwardly over the top of the float so that the water is churned and mixed with the air with a vigorous scrubbing action that produces a high rate of oxygen transfer from the air to the water.

In accordance with one aspect of the present invention, provision is made of a relatively high capacity aerator 10 whose impeller 20 is rotated by a plurality of electric motors 26 which not only effect a reduction in the cost per horsepower of the aerator 10 but which also serve to keep the aerator balanced and stable in the pond. The motors are connected to jointly drive the impeller shaft 21, are supported on the float 11, and are equally spaced from one another around the throat 17 so as to balance the float horizontally and to keep the float from tipping. The total cost of the motors 26 is less than the cost of a single large motor having a horsepower rating equal to the combined ratings of the motors 26 and, in addition, the use of the smaller motors makes the center of gravity of the aerator 10 lower than would be the case if a single large motor were used to directly drive the impeller shaft. The aerator thus is comparatively stable.

In the present instance, two motors 26 of equal horsepower (e.g., 50 h.p.) are diametrically spaced from one another on the float 11 at the periphery of the outlet of the throat 17 to provide power to the rotatable shaft 21 for turning the impeller 20. Each of the motors is carried by a mounting frame 27 (FIG. 2) having two vertical support legs 29 bolted at their lower ends to a metal ring 30 welded around the periphery of the throat. Spanning the upper ends of each pair of legs is a cross-support member 31 which is thus spaced above the throat outlet. This arrangement establishes wide flow passageways between the legs for the deflection therethrough of water slung outwardly by the rotatable diffuser 24. Welded adjacent each end of each cross-support is an upstanding, rectangular side member 33 which is joined at its top end with the other side member by an angle iron 34 spaced above and paralleling the cross-support. One of each pair of the side members 33 includes two vertically spaced brackets 35 (FIG. 3) which extend toward the other side member. A pivot shaft 36 projects vertically through each pair of brackets and is held against sliding and turning by a set screw (not shown) threaded through the top bracket to lock against the shaft. Pivoted on each shaft between the brackets are two motor mounts 37 which are connected to the respective motor by bolts (not shown) threaded into ears 39 projecting outwardly from the side of the motor. Thus, the motors are pivotally mounted on the frame 27 and are horizontally balanced on the float 11 by virtue of being spaced diametrically from each other.

The two motors 26 cooperate in driving the power shaft 21 (FIG. 3), the upper end of the shaft projecting above the outlet of the throat 17 and the lower end of the shaft extending into the throat and being fixed to both the rotatable diffuser 24 and the impeller 20 to bodily rotate both when driven by the motors. The mid portion of the shaft is supported by a plurality of spider supports 40 extending radially from a first bearing 41 journalling the shaft adjacent the top of the diffuser. At their outer ends, the spider supports are connected to the motor mounting frame 27 at the ends of the cross-support members 31. The upper portion of the power shaft is held in place by a second bearing 43 (FIG. 2) spaced downwardly from the upper end of the shaft and supported by a plurality of vertically diagonal members 44 which are connected at their outer ends to the frame cross-supports 27. Thus, the shaft is mounted on the float by means of a pyramid-like framework which acts to laterally and axially support the shaft on the float for rotation by the motors to turn the impeller and thereby pump water upwardly through the throat.

Most commercially available motors usually rotate at a faster speed than is desired for rotating the impeller 20. In order to transmit power from the motors to the drum while driving the drum at a rotational speed less than the speed of the motors, the present invention contemplates the provision of a pulley-and-belt speed reducer 45 which is of comparatively simple and inexpensive construction, which is relatively trouble-free in operation and which, at the same time, is of relatively low weight so as to avoid heavy loading on the float 11.

In this instance, the speed reducer 45 comprises small pulleys 46 mounted on the drive shafts 47 of the two motors 26 and connected by endless belts 49 to upper and lower large pulleys 50 mounted on the impeller shaft 21. The small pulleys are spaced vertically from one another so that one small pulley can be connected by one belt to the upper large pulley while the other small pulley is connected to the lower large pulley by the other belt. The small pulleys both are rotated counterclockwise and thus the impeller 20 is driven in a counterclockwise direction. Accordingly, the speed reducer 45 formed by the pulleys 46 and 50 and the belts 49 constitutes a relatively simple arrangement for driving the impeller at a speed lower than the rotational speed of the motors. Also, the reduction ratio can be charged simply by employing pulleys of different sizes.

The present invention further contemplates the provision of a belt tensioner 51 (FIGS. 2 and 3) to maintain equal tension in the belts 50 so that each motor 26 performs an equal amount of work in driving the impeller 20. This is accomplished by mounting the motors to pivot about the vertical axis through the pivot shaft 36 toward and away from the power shaft 21 such that outward movement of the motors increases the tension in the belts. Parallel lever arms 53 are connected to one side of the motors and extend therefrom toward the center of the float 11, the lever arms being urged toward each other by contractile springs 54 so as to bias the motors outwardly to tension the belts. Thus, each motor performs equal work when pumping to prevent loss in pumping efficiency or overworking of one of the motors.

In the present instance, the lever arms 53 are mounted below the larger pulleys 50 with the arm from one motor 26 being positioned on one side of the power shaft 21 and the arm from the other motor being positioned on the opposite side of the power shaft generally parallel with the first mentioned arm. The springs 54 are spaced from each other on the lever arms 53, each spring being attached to one arm intermediate its ends and connecting with the free end of the other arm as shown in FIG. 3 to draw the arms together in their parallel relationships and thereby urge the motors outwardly against the belts 49 to tension the latter.

It should be noted that the present arrangement of the belt tensioner 51, provides a system which stablizes itself since, if a greater tension is realized in one of the belts 49, the natural tendency of the system is to pivot the motor 26 with the tighter belt toward the power shaft 21. This, in turn, pivots the arm 53 connected to that motor and pulls on the springs 54 connected to the other arm so as to tend to pivot the latter arm outwardly about its own pivot shaft 36 to increase the tension in the looser belt of the other motor. Since movement of one motor induces movement in the other, equal tension is maintained in the belts so that equal power is supplied by each motor, with the result that each motor performs an equal amount of work. This eliminates any inefficiency in the pumping operation caused by unequal work performance of either motor resulting from unequal belt tensioning.

Normal usage of the aerator 10 tends to stretch the belts 49 and the contractile springs 54 provide a stable belt tensioning means which automatically adjusts within limits by reason of the resiliency of the springs to maintain a driving tension in the belts. To reset tension in the belts, one end of each spring is attached to the free end of one of the lever arms 53 with the other end of the spring connected to the end of a crank 55 extending through the other lever arm 53 intermediate the ends of the latter. Herein, each crank includes an L-shaped handle 56 projecting away from both the lever arms and a threaded shank 57 extending through a nut 59 fixed around a hole in the lever arm upon which the crank is mounted and towards the other lever arm for connection to the end of the spring. As the handle is turned, the shank is threaded through the nut to pull the spring toward the lever arm and thereby adjust the tension in the spring which in turn controls the tension in the belts.

According to another aspect of the invention, greater pumping efficiency is achieved than has been possible with prior large capacity aerators through the provision of a novel impeller 20 whose blades 23 are mounted on a large drum 60 which, in turn, is connected to and driven by the shaft 21. By supporting the blades on the drum 60, the length of the blades and thus the velocity of the water moved across the roots and tips of the blades and along the inner wall of the throat 17 can be optimized for a throat of a given diameter so as to reduce losses and increase the pumping efficiency realized for each unit of power expended.

More specifically, the impeller 20 is telescoped into the throat 17 with the blades 23 extending radially from their roots 61 at the outer wall of the drum to their tips 63 which are spaced just inwardly of the side wall of the throat. Thus, when the impeller is rotated, the blades draw liquid upwardly through the annular passage between the drum and throat walls thereby to form a liquid sleeve which eventually impinges against and is slung outwardly by the rotatable diffuser 24.

The drum 60 comprises a hollow cylindrical member whose upper end is integral with the diffuser 24. Upper and lower support disks 64 and 65 are disposed within and connected to the drum and also are fastened to the shaft 21 to couple the drum for rotation with the shaft. A hollow conical spinner 66 is secured to the lower end of the drum to streamline the flow of liquid passing upwardly toward the drum. The disks 64 and 65 and the spinner are welded to the drum and thus the hollow drum and spinner are water tight so as to prevent water from collecting in the drum and also to add buoyancy to the aerator 10.

The blades 23 may be of various shapes and different numbers of blades may be used. In this instance, four blades are spaced angularly around and welded to the outer wall of the drum 60 and are suitably shaped so as to pump water upwardly through the throat 17.

To understand the advantages obtained through the use of the drum-type impeller 20, it should be realized that drag losses resulting from the passage of the impeller blades 23 through the water in the throat 17 increase exponentially in relation to increases in the linear speed of the blades through the water. In addition, it has been found that the useful work accomplished by the blades in pumping water out of the throat increases only in a linear or slightly less than linear relationship to increases in the linear speed of the blades. To produce the greatest amount of useful work for the horsepower expended, the tips 63 of the blades are driven at a given lineal speed within an optimum low range. If the blades are rotated so that the lineal speed of the tips is higher than the given lineal speed, a greater proportion of the horsepower expended is devoted to overcoming the drag created by the increase in the speed of the blades and a lesser proportion is devoted to performing useful work than is the case when the tips are driven at the given lineal speed. Accordingly, a loss in pumping efficiency results.

To keep the pumping efficiency of the aerator 10 high, when it is desired to employ more horsepower and increase the flow rate of the water through the throat 17 while maintaining the lineal speed of the blades 23 within the optimum range and while maintaining the velocity of the water flowing through the throat relatively low for less turbulent flow, it is necessary to increase the flow area of the throat such as by increasing the diameter of the throat so that the higher rate of flow can be produced with an impeller 20 of increased diameter. If, however, the diameter of the impeller is increased solely by increasing the length of the blades 23 and the same given lineal speed is maintained at the blade tips 63, the roots 61 of the blades will move at such a slow lineal speed that water pumped by the roots will cascade or fall back downwardly across the undersides of the blades instead of passing upwardly through the throat, thereby resulting in a loss of pumping efficiency at the roots of the blades.

With the drum-type impeller 20 of the present invention, the roots 61 of the blades 23 are spaced radially outwardly from the impeller shaft 21 as a result of being mounted on the drum 60. The resulting flow area is, of course, determined by the total throat area less the area blocked by the drum. With this arrangement, when the tips 63 are moved at the given lineal speed, the roots move at a higher speed than would be the case if the roots were located directly at the shaft and, as a result, cascading of the water is avoided. Accordingly, the use of the drum enables the speed and length of the blades to be correlated with the amount of horsepower available so as to effect a high rate of flow for each unit of power expended. Moreover, a net gain in the flow area is assured due to the difference in the increased area at the periphery of the throat and the area blocked by the increase in the diameter of the drum. Increased efficiency thus is achieved (a) by employing a throat of sufficiently large diameter to pass water upwardly at a relatively high flow rate when the water is moved at a comparatively low velocity, (b) by rotating the drum at a sufficiently low rotational speed to keep the lineal speed of the blade within an optimum low range to reduce drag and losses across the blade, and (c) by setting the blades outwardly of the shaft 21 (through the use of the drum) so that, in spite of the relatively low speed of the blade tips, the roots 61 will move sufficiently fast to avoid downward cascading of the water. The drum thus enables the use of blades of optimum length so that, regardless of the size of the throat 17 in any given aerator, the lineal speed of the tips of the blades of each aerator can be maintained at a constant value and the lineal speed of the roots of the blades can be maintained at a lower constant value.

In aerating liquid of given flow characteristics, it has been found that, regardless of the size of the aerator 10, optimum efficiency can be obtained by moving the tips 63 of the blades 23 at 47.6 feet per second and by moving the roots 61 at 22.9 feet per second. These parameters are maintained and optimum efficiency is obtained with a 50 horsepower aerator (i.e., one using two 25 horsepower motors) by using a drum 60 with a diameter of 21.23 inches in a throat 17 with an inside diameter of 44.95 inches, by using blades with a length of 11.48 inches, and by rotating the drum at 247 R.P.M. With a 100 horsepower aerator, the diameters of the drum and the throat are increased to 30.0 and 64.0 inches, respectively, the blades are increased to a length of 16.25 inches and the drum is rotated at 175 R.P.M. The root and tip velocities thus are maintained substantially the same as in the smaller aerator and yet the net flow area through the throat is increased to enable the power of the larger aerator to be used efficiently to produce a higher rate of flow.

I claim as my invention:

1. A liquid aerator having a vertically extending opening formed therethrough, an upright tubular throat telescoped into said opening and having a lower inlet end for immersion in the liquid, a power rotated shaft extending into said throat, and an impeller fixed to and rotatable with said shaft to pump liquid upwardly through said throat in response to the rotation of said shaft, the improvement in said aerator comprising, a pair of motors substantially equally spaced diametrically from one another around said shaft, pulleys and drive belts between said motors and said power rotated shaft, each of said motors mounted to pivot generally toward and away from said power rotated shaft about a vertical axis adjacent one side of each motor so as to adjust the tension in said drive belts, lever means for pivoting each motor about each said axis, and spring means connected to said lever means for biasing said motors against said drive belts in order to equalize and adjust the tension in the belts.

2. The aerator as defined in claim 1 wherein said spring means comprises coil springs, each of said spring means being connected to the inner end portion of one lever means and to the other lever means at a position intermediate the ends of said other lever means, said power rotated shaft being located between the two springs.

3. The aerator as defined in claim 1 further characterized by means for adjusting the tension of said spring means.

4. A liquid aerator comprising a float support having an upright tubular throat adapted for immersion in a body of liquid at its lower inlet end and defining an outlet at its upper end, a power rotated shaft extending into said throat, a central drum telescoped into said throat and fixed to and rotatable with said shaft, a plurality of angularly spaced blades extending outwardly of said drum within said throat and having tips spaced inwardly from the side of said throat to pump a sleeve of liquid upwardly through said throat between the drum and the side of the throat in response to rotation of said drum, a diffuser positioned above said float coaxially with said throat and shaped to deflect said upwardly pumped sleeve of liquid outwardly over the top of the float, said drum including a lower support disk connected to the bottom of the drum with a water-tight seal and an upper support disk connected to the top of said drum with a water-tight seal thereby sealing said drum to give additional buoyancy to the aerator.

5. The aerator as defined in claim 4 wherein said shaft extends into said drum through both said upper and lower disks and is connected to each disk.

6. The aerator as defined in claim 4 wherein said diffuser is connected to the top of said drum for bodily rotation therewith.

7. The aerator as defined in claim 4 further including a generally conical spinner connected to the lower end of said drum to streamline the upward flow of liquid as the latter is drawn into the the throat.

8. A liquid aerator having a vertically extending opening formed therethrough, an upright tubular throat telescoped into said opening and having a lower inlet end for immersion in the liquid, a power rotated shaft extending into said throat, and an impeller fixed to and rotatable with said shaft to pump liquid upwardly through said throat in response to the rotation of said shaft, the improvement in said aerator comprising, a plurality of motors substantially equally spaced from one another around said shaft, pulleys and drive belts between said motors and said power rotated shaft, each of said motors pivotally mounted for movements generally toward and away from said power rotated shaft about a vertical axis adjacent one side of each motor to adjust the tension in said drive belts, lever means connected to each motor for pivoting each motor about said axis, and spring means connected to said lever means for biasing said motors against said drive belts in order to equalize and adjust the tension in the belts.

9. The aerator as defined in claim 8 wherein each said spring means is connected to the lever means of the opposite motor.

10. The aerator as defined in claim 8 further characterized by means for adjusting the tension of said spring means.

* * * * *

UNITED STATES PATENT OFFICE
CERTIFICATE OF CORRECTION

Patent No. 3,739,986  Dated June 19, 1973

Inventor(s) Richard B. Ravitts

It is certified that error appears in the above-identified patent and that said Letters Patent are hereby corrected as shown below:

Change the title to -- SPRAY DEVICE ADAPTED FOR USE AS AN AERATOR --.

IN THE ABSTRACT

Line 1, after "liquid" insert -- spray device, for example, a spray device which may be used as an --.

Column 1, line 4, after "liquid" insert -- spray device, for example, a spray device which may be used as an --.

Column 1, line 21, after "horsepower" insert -- spray device for use as an --.

Column 1, line 64, after "liquid" insert -- spray device for use as an --.

Column 2, lines 3, 6, 12, 17 and 66, cancel "aerator" and substitute -- spray device --.

Column 4, line 57, cancel "aerator" and substitute -- spray device --.

Column 5, lines 11 and 41, cancel "aerator" and substitute -- spray device --.

Column 6, lines 51, 52, 56, 61, 66, cancel "aerator" and substitute -- spray device --.

Column 7, lines 3 and 5, cancel "aerator" and substitute -- spray device --.

UNITED STATES PATENT OFFICE
CERTIFICATE OF CORRECTION

Patent No. 3,739,986          Dated June 19, 1973

Inventor(s) Richard B. Ravitts          Page - 2

It is certified that error appears in the above-identified patent and that said Letters Patent are hereby corrected as shown below:

IN THE CLAIMS

Column 7, lines 8 and 37, after "liquid" insert -- spray device which is adapted for use as an --.

Column 7, line 15, cancel "aerator" and substitute -- spray device --.

Column 7, lines 27 and 34, cancel "aerator" and substitute -- spray device --.

Column 8, line 20, after "liquid" insert -- spray device which is adapted for use as an --.

Column 8, lines 10, 16, 27, 40 and 43, cancel "aerator" and substitute -- spray device --.

Signed and sealed this 20th day of August 1974.

(SEAL)
Attest:

McCOY M. GIBSON, JR.
Attesting Officer

C. MARSHALL DANN
Commissioner of Patents